(12) United States Patent
Tanaka et al.

(10) Patent No.: US 9,376,164 B2
(45) Date of Patent: Jun. 28, 2016

(54) ELECTRICALLY ASSISTED VEHICLE

(71) Applicant: YAMAHA HATSUDOKI KABUSHIKI KAISHA, Iwata-shi, Shizuoka (JP)

(72) Inventors: Hiroshi Tanaka, Shizuoka (JP); Fuminao Obayashi, Shizuoka (JP); Kazuto Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/539,002

(22) Filed: Nov. 12, 2014

(65) Prior Publication Data
US 2015/0136509 A1 May 21, 2015

(30) Foreign Application Priority Data
Nov. 18, 2013 (JP) .................................. 2013-238176

(51) Int. Cl.
*B62M 6/50* (2010.01)
*B60L 11/00* (2006.01)
*B60L 15/20* (2006.01)

(52) U.S. Cl.
CPC ................ *B62M 6/50* (2013.01); *B60L 11/007* (2013.01); *B60L 15/20* (2013.01); *B60L 2200/12* (2013.01); *B60L 2220/42* (2013.01); *Y02T 10/645* (2013.01); *Y02T 10/648* (2013.01); *Y02T 10/72* (2013.01); *Y02T 10/7275* (2013.01)

(58) Field of Classification Search
CPC ........ B62M 6/50; B60L 11/007; B60L 15/20; B60L 2200/12; B60L 2220/42
USPC ........................................... 180/206.1, 206.3
See application file for complete search history.

(56) References Cited

U.S. PATENT DOCUMENTS

| 2003/0213630 | A1 | 11/2003 | Pyntikov et al. |
| 2004/0206563 | A1 | 10/2004 | Murata |
| 2007/0169973 | A1 | 7/2007 | Masut et al. |
| 2011/0183805 | A1* | 7/2011 | Chan .............................. 475/254 |
| 2012/0012412 | A1* | 1/2012 | Moeller et al. .............. 180/206.2 |

(Continued)

FOREIGN PATENT DOCUMENTS

| CN | 102639351 A | 8/2012 |
| DE | 10 2010 018 138 A1 | 10/2011 |
| EP | 2 289 794 A1 | 3/2011 |
| EP | 2 537 739 A1 | 12/2012 |
| EP | 2 604 499 A1 | 6/2013 |

(Continued)

*Primary Examiner* — Jacob Knutson
(74) *Attorney, Agent, or Firm* — Keating and Bennett, LLP (57) ABSTRACT

An electrically assisted vehicle includes a vehicle body, pedals to input human power, a crank that is coupled to the pedals and freely rotatably supported on the vehicle body, a wheel (i.e., at least one wheel) that is attached to the vehicle body and rotates according to a rotation of the crank, a first electric motor that is attached to the vehicle body and drives the wheel, a second electric motor that is attached to the vehicle body and drives the wheel or another wheel, a torque detection unit that detects a torque applied to the crank, a torque command value calculation unit, and a motor drive unit that drives the first electric motor and second electric motor according to a calculated torque command value. The torque command value calculation unit calculates a first torque command value for the first electric motor and a second torque command value for the second electric motor according to a torque detected by the torque detection unit, and calculates the first and second torque command values such that the first and second torque command values are mutually shifted in phase.

7 Claims, 5 Drawing Sheets

(56) References Cited

U.S. PATENT DOCUMENTS

2012/0239237 A1    9/2012   Hashimoto
2012/0256568 A1   10/2012   Lee
2013/0054065 A1*   2/2013   Komatsu .................. 701/22
2014/0305727 A1*  10/2014   Gao ...................... 180/206.4

FOREIGN PATENT DOCUMENTS

| | | |
|---|---|---|
| EP | 2604499 A1 * | 6/2013 |
| JP | 2000-168672 A | 6/2000 |
| JP | 2007-112406 A | 5/2007 |
| TW | 201325989 A1 | 7/2013 |

* cited by examiner

ELECTRICALLY ASSISTED VEHICLE

BACKGROUND OF THE INVENTION

1. Field of the Invention

The present invention relates to an electrically assisted vehicle including pedals to input human power and an electric motor to drive a wheel.

2. Description of the Related Art

US2007/0169973 A1 discloses a two-wheeled vehicle including a front wheel electric motor that drives a front wheel, a rear wheel electric motor that drives a rear wheel, and pedals. Wheel drive modes include an integral wheel drive mode for activating both motors, a rear wheel drive mode for activating only the rear wheel electric motor, a front wheel drive mode for activating only the front wheel electric motor, and pedaling assist that drives the rear wheel by the pedals and the rear wheel electric motor.

SUMMARY OF THE INVENTION

The inventors of preferred embodiments of the present invention described and claimed in the present application conducted an extensive study and research regarding an electrically assisted vehicle, such as the one described above, and in doing so, discovered and first recognized new unique challenges and previously unrecognized possibilities for improvements as described in greater detail below.

In an electrically assisted bicycle that is an example of an electrically assisted vehicle, a crank is rotated by a pedal force applied to the pedals, and the crank rotation is transmitted to a rear wheel. On the other hand, an assist torque of a magnitude proportional to the torque applied to the crank is generated by the electric motor, and the assist torque generated by the electric motor is transmitted to the rear wheel. Accordingly, driving of the wheel by human power can be assisted by a torque generated by the electric motor.

The present inventors have conducted a study of an electrically assisted bicycle with such an arrangement. In the course of their study, the present inventors discovered a challenge as described below, and developed the preferred embodiments of the present invention.

In the conventional electrically assisted bicycle, an assist torque proportional to a pedal force torque applied from the pedals to the crank is generated from the electric motor in synchronization with the pedal force torque. The pedal force torque to be applied to the crank rises from the starting point of a crank angle slightly beyond the top dead center of the pedal and decreases toward the bottom dead center through the maximum value. At this time, a moment arises where an assist torque generated by the electric motor becomes excessively great at the timing of a near-maximum value of the pedal force torque, and the rotation speed of the wheel becomes fast as compared with the rotation speed of the crank, and the crank rotates freely for a certain time in some cases. At this time, resistance from the pedals suddenly decreases, so that the driver experiences a feeling of no response to the pedal force. That is, the driver experiences a feeling that the applied pedal force is not effectively transmitted to the rear wheel. Such a feeling of no response to pedal force makes the riding feeling poor.

A preferred embodiment of the present invention provides an electrically assisted vehicle including a vehicle body, pedals to input human power, a crank that is coupled to the pedals, and freely rotatably supported on the vehicle body, a wheel (i.e., at least one wheel) that is attached to the vehicle body and is configured to rotate according to a rotation of the crank, a first electric motor that is attached to the vehicle body and is configured to drive the wheel, a second electric motor that is attached to the vehicle body and is configured to drive the wheel or another wheel, a torque detection unit that is configured to detect a torque applied to the crank, a torque command value calculation unit that is configured or programmed to calculate a first torque command value for the first electric motor and a second torque command value for the second electric motor according to a torque detected by the torque detection unit and calculate the first and second torque command values such that the first and second torque command values are mutually shifted in phase, and a motor drive unit that is configured to drive the first electric motor and second electric motor according to, respectively, the first torque command value and second torque command value calculated by the torque command value calculation unit.

According to this arrangement, when human power is input to the pedals to rotate the crank, the wheel attached to the vehicle body rotates according thereto, and the vehicle is thus caused to run. The first electric motor drives one wheel, and the second electric motor drives the same wheel or another wheel. Accordingly, an assist driving force to assist human power driving is generated by the first electric motor and the second electric motor to impart the assist driving force to the vehicle. The first and second torque command values for the first and second electric motors are mutually shifted in phase. Because an assist driving force to be imparted to the vehicle is temporally smoothed, the assist driving force is prevented from momentarily becoming excessively great. Because a sudden decrease in resistance from the pedals is thus reliably avoided, the feeling of no response to the pedal force is also reliably avoided, and an electrically assisted vehicle with a satisfactory riding feeling is provided.

Additionally, because the first and second torque command values are mutually shifted in phase, peak values of a drive current are capable of being made small. Because the first and second electric motors are accordingly driven by a battery with a small output, the battery is downsized, and the vehicle is significantly reduced in weight as a result.

In a preferred embodiment of the present invention, one of the first torque command value and the second torque command value is in synchronization with a torque that the torque detection unit detects. Accordingly, a driving force that is in synchronization with a torque due to human power applied to the crank is generated from one electric motor, while a driving force shifted in phase from the driving force is generated from the other electric motor. Because the assist driving force generated by the first and second electric motors accordingly includes an assist driving force component corresponding to temporal changes in pedal force, a natural riding feeling is achieved.

In a preferred embodiment of the present invention, the wheel (i.e., the at least one wheel) includes a front wheel and a rear wheel, a rotating force of the crank is transmitted to the rear wheel, the first electric motor is disposed so as to drive the rear wheel, the second electric motor is disposed so as to drive the front wheel, and the first torque command value or second torque command value is in synchronization with a torque that the torque detection unit detects. According to this arrangement, because the first and second electric motors drive the rear wheel and front wheel, respectively, a two-wheel drive type of electrically assisted vehicle is provided. Moreover, because one of the first and second electric motors generates an assist driving force that is in synchronization with a pedal force applied to the pedals, a natural riding feeling is achieved.

In a preferred embodiment of the present invention, the wheel (i.e., the at least one wheel) includes a first wheel to which a rotating force of the crank is transmitted and a second wheel to which a rotating force of the crank is not transmitted, the first electric motor drives the first wheel, and the first torque command value is in synchronization with a torque that the torque detection unit detects. According to this arrangement, the assist driving force generated by the first electric motor to drive the first wheel to which a rotating force of the crank is transmitted is in synchronization with the pedal force applied to the pedals. Accordingly, an even more natural riding feeling is achieved. The first wheel may be a rear wheel when the electrically assisted vehicle includes a front wheel and a rear wheel.

In a preferred embodiment of the present invention, the first torque command value and the second torque command value are shifted 90 degrees in phase when one rotation of the crank is provided as one period. According to this arrangement, driving forces to be generated by the first and second electric motors are shifted in phase by 90 degrees as converted to a rotation angle of the crank. Because the driving force is capable of being correspondingly smoothed effectively, an excellent riding feeling is achieved. Additionally, because peaks of the drive current are significantly reduced or minimized, a battery with a small current output is capable of being used, and as a result, the vehicle is significantly reduced in weight.

The electrically assisted vehicle according to a preferred embodiment of the present invention preferably further includes a vehicle speed detection unit that is configured to detect a vehicle speed of the electrically assisted vehicle, and the torque command value calculation unit is configured or programmed to match the first torque command value and the second torque command value in phase when a vehicle speed that the vehicle speed detection unit detects is not more than a first speed, and shift the first torque command value and the second torque command value in phase when a vehicle speed that the vehicle speed detection unit detects is over the first speed. According to this arrangement, when the vehicle speed is not more than the first vehicle speed, driving forces of the first and second electric motors are matching in phase, so that at the time of low-speed running such as the time of starting, a great assist driving force is imparted to the vehicle. In particular, by causing driving forces of the first and second electric motors to be synchronized with a pedal force applied to the pedals (that is, in synchronization with a torque applied to the crank), a great assist driving force that is in synchronization with the driver's pedal force is generated. Driving of the vehicle is accordingly assisted by the great assist driving force at the time of low-speed running such as the time of starting. On the other hand, if the vehicle speed exceeds the first vehicle speed, driving forces of the first and second electric motors are shifted in phase, so that the driving force is be smoothed to avoid the feeling of no response to the pedal force, and a peak current is made small.

In a preferred embodiment of the present invention, the torque command value calculation unit preferably is configured to shift the first torque command value and second torque command value 90 degrees in phase when a vehicle speed that the vehicle speed detection unit detects is over a second speed greater than the first speed, and calculate the first and second torque command values in accordance with characteristics in which a phase shift of the first torque command value and second torque command value increases from 0 degrees to 90 degrees according to an increase in vehicle speed when a vehicle speed that the vehicle speed detection unit detects is over the first speed and not more than the second speed. If the vehicle speed is in a range of the first speed to the second speed, first and second torque command values are obtained in accordance with characteristics in which a phase shift of the first and second torque command value increases from 0 degrees to 90 degrees according to an increase in vehicle speed. Therefore, the phase shift of driving forces of the first and second electric motors gradually increases as the vehicle accelerates. Thus, a state transition is smoothly performed between a state with no phase shift and a state with a phase shift of 90 degrees, without negatively effecting the riding feeling, that is, without causing a feeling of discontinuity of the driving force with a sudden change in driving characteristics. Accordingly, an electrically assisted vehicle with a good riding feeling is realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
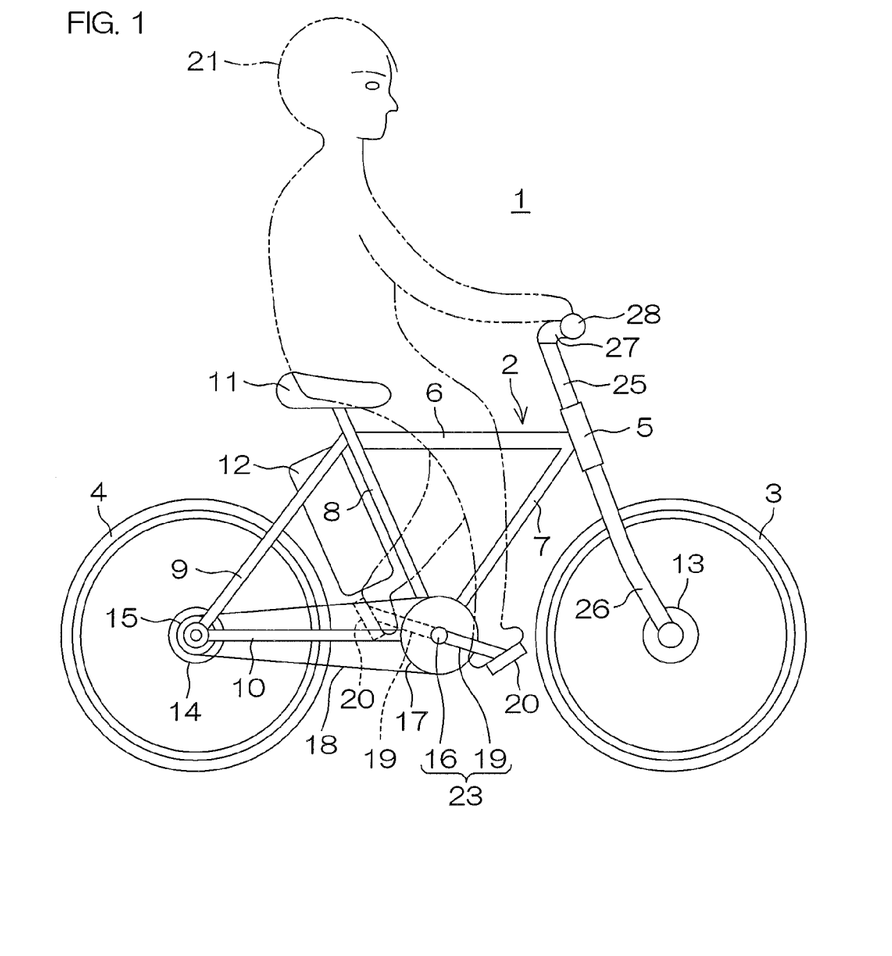
FIG. 1 is a side view for describing a configuration of an electrically assisted vehicle according to a preferred embodiment of the present invention.

FIG. 1 is a side view for describing a configuration of an electrically assisted vehicle according to a preferred embodiment of the present invention. The electrically assisted vehicle 1 preferably is a two-wheeled vehicle including a front wheel 3, a rear wheel 4, a human power drive system configured to drive the rear wheel 4 by human power, and an electromotive drive system configured to drive the front wheel 3 and the rear wheel 4 by electric motors 13 and 14, respectively.

The electrically assisted vehicle 1 includes a frame 2 that constitutes a vehicle body, a front wheel 3 attached to the frame 2, and a rear wheel 4 also attached to the frame 2. The frame 2 includes a head pipe 5, an upper pipe 6, a front pipe 7, a seat pipe 8, a pair of left and right rear pipes 9, and a pair of left and right lower pipes 10. The upper pipe 6 extends rearward from the head pipe 5. The front pipe 7 is disposed under the upper pipe 6, and extends obliquely downward from the head pipe 5 toward the rear. The seat pipe 8 extends upward from the rear end portion of the front pipe 7. The rear end portion of the upper pipe 6 is coupled to the seat pipe 8. A saddle 11 is attached to the upper end portion of the seat pipe 8. Under the saddle 11, a battery 12 is attached to the seat pipe 8.

The pair of rear pipes 9 are parallel or substantially parallel to each other. The pair of rear pipes 9 extend rearward and obliquely downward from the rear end portion of the upper pipe 6. On the other hand, the pair of lower pipes 10 are parallel or substantially parallel to each other. The pair of lower pipes 10 extend rearward from the rear end portion of the front pipe 7 substantially horizontally. Rear end portions of the pair of rear pipes 9 are respectively coupled with rear end portions of the pair of lower pipes 10. A rear wheel sprocket 15 and the rear wheel 4 are freely rotatably attached to the coupling portion of the rear pipes 9 and the lower pipes 10. The rear wheel 4 includes a hub in which a rear wheel electric motor 14 is incorporated. The rear wheel electric motor 14 is configured to impart a driving force to the rear wheel 4.

A crankshaft 16 is freely rotatably attached to a coupling portion of the front pipe 7 and the seat pipe 8, such that the crankshaft extends horizontally to the left and right. A drive sprocket 17 is attached to the crankshaft 16. An endless chain 18 is wound around the drive sprocket 17 and the rear wheel sprocket 15. A rotation of the crankshaft 16 is therefore transmitted from the drive sprocket 17 via the chain 18 to the rear wheel sprocket 15. A pair of crank arms 19 are respectively attached to both end portions of the crankshaft 16. The crankshaft 16 and the pair of crank arms 19 constitute a crank 23. A pair of pedals 20 are respectively attached to the pair of crank arms 19. By a driver 21 operating the pedals 20, the crankshaft 16 is rotated, which enables driving of the rear wheel 4 by human power.

A steering shaft 25 is freely rotatably inserted into the head pipe 5. A pair of front forks 26 are attached parallel or substantially parallel to each other to a lower end portion of the steering shaft 25. The front wheel 3 is freely rotatably attached to lower end portions of the pair of front forks 26. The front wheel 3 includes a hub in which a front wheel electric motor 13 is incorporated. The front wheel electric motor 13 is configured to impart a driving force to the front wheel 3. A handle bar 27 is attached to the upper end of the steering shaft 25. The handle bar 27 extends horizontally or substantially horizontally, and includes a pair of grips 28 that are respectively grasped by the right hand and left hand of the driver 21. By the driver 21 operating the handle bar 27 to turn to the left and right, the steering shaft 25 turns about an axis center of the head pipe 5, and in accordance therewith, the front forks 26 and the front wheel 3 integrally turn to the left and right. The electrically assisted vehicle 1 is thus steered.

Figure 2:
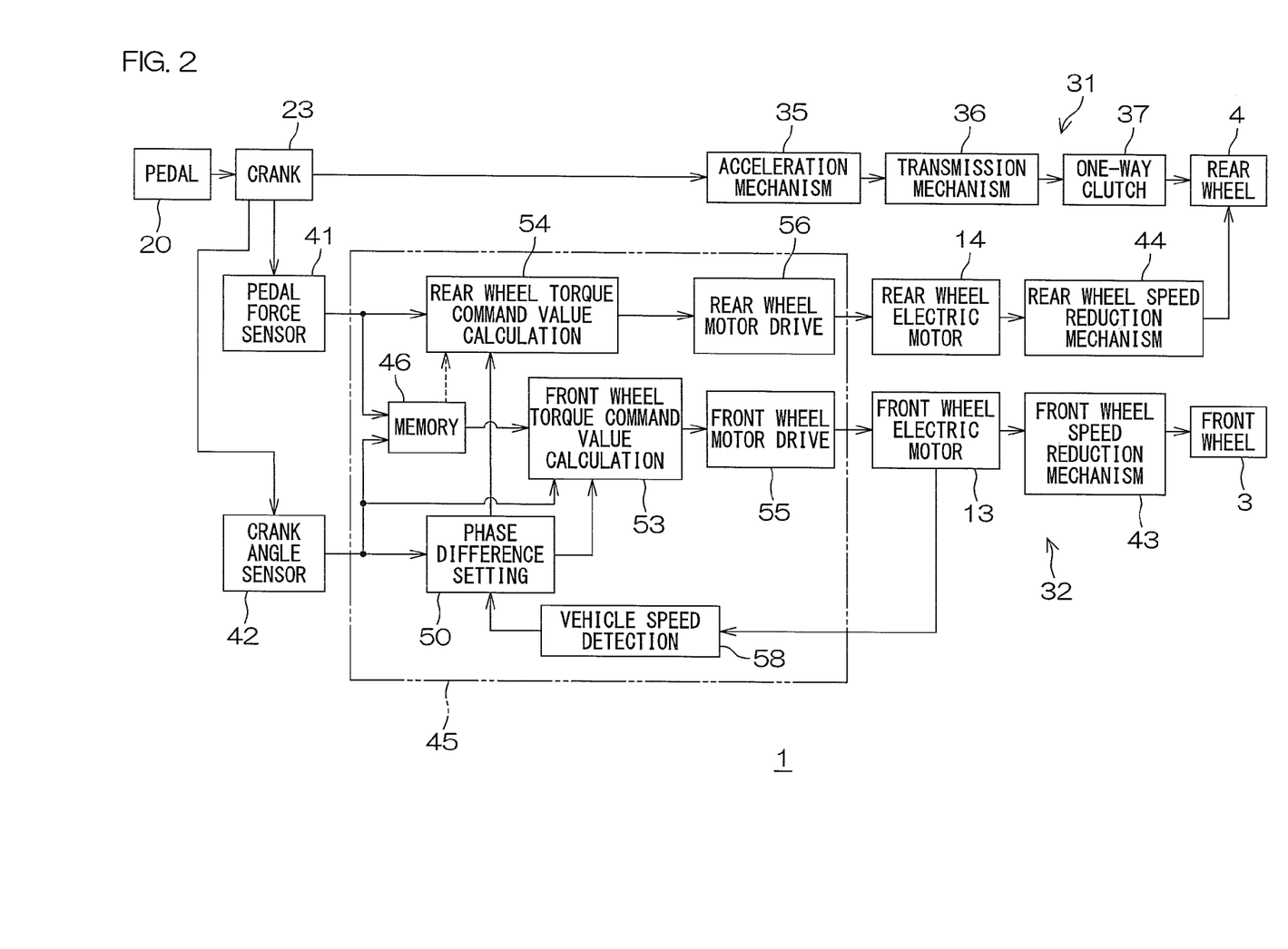
FIG. 2 is a block diagram for describing a configuration of a control system of the electrically assisted vehicle.

FIG. 2 is a block diagram for describing a configuration of a control system of the electrically assisted vehicle 1. The electrically assisted vehicle 1 includes a human power drive system 31 configured to transmit a pedal force applied to the pedals 20 by the driver 21 at a predetermined gear shift ratio to be supplied to the rear wheel 4, and an electromotive drive system 32 configured to supply driving forces of the rear wheel electric motor 14 and the front wheel electric motor 13 to the rear wheel 4 and the front wheel 3, respectively.

The human power drive system 31 includes the crank 23 that rotates due to a pedal force applied to the pedals 20, an acceleration mechanism 35, a transmission mechanism 36, and a one-way clutch 37. The acceleration mechanism 35 includes the drive sprocket 17, the chain 18, and the rear wheel sprocket 15. The rotation of the crank 23 is accelerated according to a gear ratio between the drive sprocket 17 and the rear wheel sprocket 15. The transmission mechanism 36 is, for example, housed in the rear wheel hub, and arranged to shift a rotation of an input shaft coupled to the rear wheel sprocket 15 at any of the plurality of (for example, three) gear shift ratio stages to be output to an output shaft. The one-way clutch 37 transmits a rotating force in one direction (forward drive direction) of the output shaft of the transmission mechanism 36 to the rear wheel 4, and does not transmit a rotation in the other direction (reverse drive direction). Therefore, a rotating force in the forward drive direction (human power torque) applied to the crank 23 is changed in speed by the transmission mechanism 36 after being accelerated by the acceleration mechanism 35, and is transmitted to the rear wheel 4 via the one-way clutch 37.

The electromotive drive system 32 drives the rear wheel electric motor 14 and the front wheel electric motor 13 according to an output of a pedal force sensor 41 and an output of a crank angle sensor 42. The pedal force sensor 41 detects a pedal force (torque) applied to the crank 23, and outputs a pedal force signal according to the pedal force. The pedal force sensor 41 is an example of a torque detection unit configured to detect a torque applied to the crank 23. The crank angle sensor 42 detects a crank angle that is a rotation angle of the crankshaft 16. The reference position of a crank angle (rotational position with a crank angle=0 degrees) may be set at a position where a pedal force applied by the driver 21 rises from zero, for example. Such a reference position can be set, for example, between a top dead center position where one crank arm 19 points directly upward from the crankshaft 16 and a forward horizontal position where the one crank arm 19 points horizontally forward from the crankshaft 16. More specifically, a position where the crank arm 19 is inclined forward about 30 degrees from the top dead center position may be provided as the reference position of a crank angle, for example.

The electromotive drive system 32 includes the pedal force sensor 41, the crank angle sensor 42, the front wheel electric motor 13, the rear wheel electric motor 14, a front wheel speed reduction mechanism 43, a rear wheel speed reduction mechanism 44, and a controller 45. The controller 45 is configured or programmed to drive the front wheel electric motor 13 and the rear wheel electric motor 14 according to outputs of the pedal force sensor 41 and the crank angle sensor 42. A rotation of the front wheel electric motor 13 is reduced by the front wheel speed reduction mechanism 43, and transmitted to the front wheel 3. A rotation of the rear wheel electric motor 14 is reduced by the rear wheel speed reduction mechanism 44, and transmitted to the rear wheel 4.

The controller 45 is configured or programmed to include a front wheel torque command value calculation unit 53 and a rear wheel torque command value calculation unit 54 configured or programmed to calculate a front wheel torque command value and a rear wheel torque command value, respectively, according to outputs of the pedal force sensor 41 and the crank angle sensor 42. Further, the controller 45 is configured or programmed to include a front wheel motor drive unit 55 configured to drive the front wheel electric motor 13 based on a front wheel torque command value, and a rear wheel motor drive unit 56 that drives the rear wheel electric motor 14 based on a rear wheel torque command value. The front wheel torque command value is a command value for a drive torque that needs to be generated by the front wheel electric motor 13. The rear wheel torque command value is a command value for a drive torque that needs to be generated by the rear wheel electric motor 14. The front wheel motor drive unit 55 and the rear wheel motor drive unit 56 are configured or programmed to perform PWM (pulse width modulation)-control of a drive voltage from the battery 12 at duty ratios respectively corresponding to the front wheel torque command value and rear wheel torque command value. The PWM-controlled drive voltages are applied to the front wheel electric motor 13 and the rear wheel electric motor 14. Drive currents respectively corresponding to the front wheel torque command value and rear wheel torque command value thus flow to the front wheel electric motor 13 and the rear wheel electric motor 14.

The front wheel torque command value calculation unit 53 and the rear wheel torque command value calculation unit 54 are examples of a torque command value calculation unit. Also, the front wheel motor drive unit 55 and the rear wheel motor drive unit 56 are examples of a motor drive unit.

The controller 45 is configured or programmed to further include a vehicle speed detection unit 58. The vehicle speed detection unit 58 detects a vehicle speed of the electrically assisted vehicle 1 to output vehicle speed information. The vehicle speed detection unit 58 may be configured to detect a vehicle speed based on the rotation speed of the front wheel 3 or the rear wheel 4, for example. More specifically, the vehicle speed detection unit 58 may preferably be configured to detect a vehicle speed of the electrically assisted vehicle 1 based on the rotation speed of the front wheel electric motor 13 or the rear wheel electric motor 14. The vehicle speed detection unit 58 does not necessarily need to obtain a vehicle speed of the electrically assisted vehicle 1, but it suffices to output vehicle speed information corresponding to the vehicle speed. Specifically, because the rotation speed of the front wheel 3 or the rear wheel 4 is proportional to the vehicle speed, the rotation speed may be output as vehicle information. Similarly, because the rotation speed of the front wheel electric motor 13 or the rear wheel electric motor 14 is proportional to the vehicle speed, the motor rotation speed may be output as vehicle information. FIG. 2 shows an example where the vehicle speed detection unit 58 outputs vehicle speed information corresponding to the rotation speed of the front wheel electric motor 13.

The controller 45 further includes a phase difference setting unit 50 that sets phase differences of a rear wheel torque command value and a front wheel torque command value with respect to the phase of a pedal force based on the crank angle detected by the crank sensor 42 and the vehicle speed detected by the vehicle speed detection unit 58. When the vehicle speed detected by the vehicle speed detection unit 58 is not more than a predetermined first vehicle speed threshold (e.g. 0 km/h), the phase difference setting unit 50 sets the phase difference of a rear wheel torque command value with respect to the phase of a pedal force to zero, and sets the phase difference of a front wheel torque command value with respect to the phase of a pedal force to zero. Therefore, the phase shift angle (relative phase difference) between the front wheel torque command value and the rear wheel torque command value becomes zero. On the other hand, when the vehicle speed detected by the vehicle speed detection unit 58 is over a predetermined second vehicle speed threshold (e.g., about 30 km/h) greater than the first vehicle speed threshold, the phase difference setting unit 50 sets the phase difference of a rear wheel torque command value with respect to the phase of a pedal force to zero, and sets the phase difference of a front wheel torque command value with respect to the phase of a pedal force to 90 degrees, for example. Therefore, the phase shift angle between the front wheel torque command value and the rear wheel torque command value becomes 90 degrees, for example. When the vehicle speed detected by the vehicle speed detection unit 58 is greater than the first vehicle speed threshold and not more than the second vehicle speed threshold, the phase difference setting unit 50 keeps the phase difference of a rear wheel torque command value with respect to the phase of a pedal force to zero, while setting the phase difference of a front wheel torque command value with respect to the phase of a pedal force to a value in the range of 0 degrees to 90 degrees according to the vehicle speed (for example, in proportion to the vehicle speed). More specifically, the phase difference of a front wheel torque command value with respect to the phase of a pedal force is set so as to be greater as the vehicle speed is greater.

If the reference position of a crank angle has been set at the rising position of a pedal force as described above, the phase difference of a front wheel torque command value and the phase difference of a rear wheel torque command value with respect to the phase of a pedal force are equivalent to the phase difference of a front wheel torque command value and the phase difference of a rear wheel torque command value with respect to the phase of a crank angle.

Figure 3:
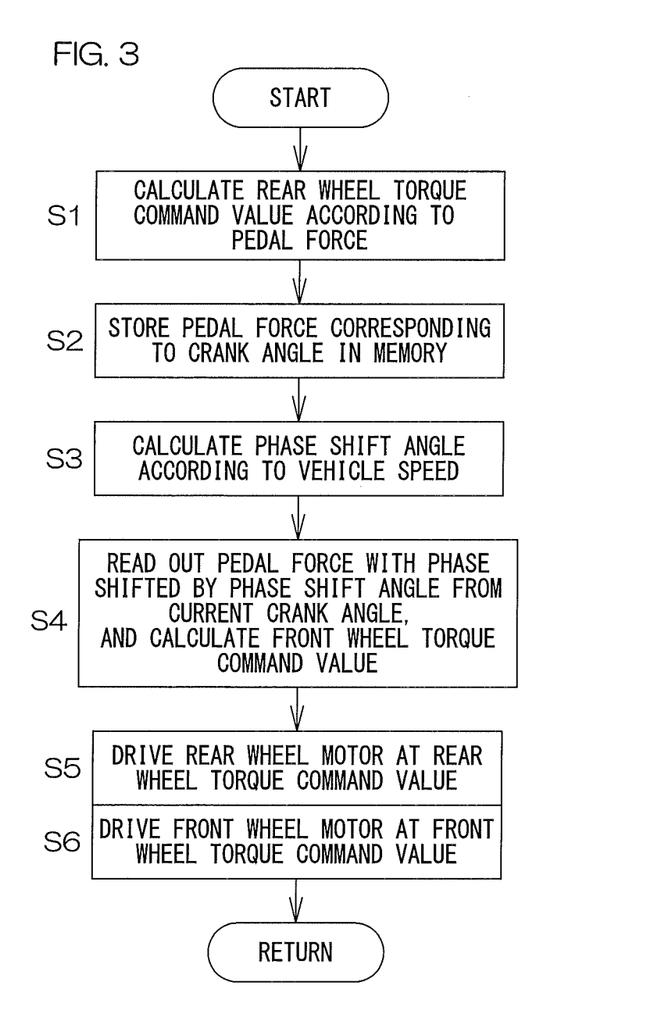
FIG. 3 is a flowchart for describing a processing example of a controller regarding control of a rear wheel electric motor and a front wheel electric motor.

FIG. 3 is a flowchart for describing a processing example of the controller 45 regarding control of the rear wheel electric motor 14 and the front wheel electric motor 13. When a pedal force is detected by the pedal force sensor 41, the controller 45 (rear wheel torque command value calculation unit 54), for example, calculates a rear wheel torque command value proportional to the pedal force detected by the pedal force sensor 41 (step S2). In this case, the rear wheel torque command value is a value for which the pedal force is multiplied by a certain rear wheel assist ratio. Therefore, the phase of the rear wheel torque command value coincides with the phase of the pedal force.

The controller 45 correlates and stores an output signal of the crank angle sensor 42 and an output signal of the pedal force sensor 41 in a memory 46 (FIG. 2) (step S2). That is, the controller 45 stores a pedal force corresponding to a crank angle in the memory 46.

Further, the controller 45 (phase difference setting unit 50) calculates phase shift angles for the rear wheel torque command value and the front wheel torque command value based on vehicle speed information generated by the vehicle speed detection unit 58 (step S3). In the processing example, the pedal force and rear wheel torque command value are in the same phase, so that the phase difference setting unit 50 obtains a phase difference of the front wheel torque command value with respect to the pedal force.

The controller 45 (front wheel torque command value calculation unit 53) reads out from the memory 46 a pedal force corresponding to a crank angle shifted in phase by the phase shift angle from the current crank angle, and calculates a front wheel torque command value proportional to the pedal force (step S4). Therefore, the phase of the front wheel torque command value shifts by the phase shift angle from the rear wheel torque command value. The magnitude of the front wheel torque command value is a value proportional to the pedal force despite the shift in phase, and is a value for which the pedal force is multiplied by a certain front wheel assist ratio. In other words, the magnitude of the front wheel torque command value is a value for which the pedal force shifted in phase by the phase shift angle is multiplied by the front wheel assist ratio.

The controller 45 (rear wheel motor drive unit 56) supplies a current according to the calculated rear wheel torque command value to the rear wheel electric motor 14 (step S5). Therefore, to the rear wheel 4, together with a pedal force applied by the driver, a rear wheel assist force (rear wheel assist torque) that is in synchronization with the pedal force is supplied from the rear wheel electric motor 14. A rear wheel driving force to drive the rear wheel therefore equals a total value of the pedal force and the rear wheel assist force. On the other hand, the controller 45 (front wheel motor drive unit 55) supplies a current according to the calculated front wheel torque command value to the front wheel electric motor 13 (step S6). As a result, the phase of a front wheel assist force (front wheel assist torque) that the front wheel electric motor 13 supplies to the front wheel 3 shifts from the pedal force by the phase shift angle. The pedal force and the rear wheel assist force are in the same phase, so that with respect to the rear wheel driving force (=pedal force+rear wheel assist force) being a total of those forces, the phase of a front wheel driving force (=front wheel assist force) shifts by the phase shift angle.

The processing example of the flowchart shows a case where the rear wheel torque command value is in the same phase and the front wheel torque command value is in a different phase with respect to the pedal force. In the case of shifting not only the phase of the front wheel torque command value but also the phase of the rear wheel torque command value from the phase of the pedal force, the controller 45 respectively calculates a front wheel phase shift angle and a rear wheel phase shift angle with respect to a pedal force based on vehicle speed information. Then, the controller 45 reads out from the memory 46 pedal forces corresponding to crank angles respectively shifted in phase by the front wheel phase shift angle and the rear wheel phase shift angle from the current crank angle, and calculates a front wheel torque command value and a rear wheel torque command value respectively proportional to those pedal forces. Accordingly, the phase of the front wheel torque command value shifts from the pedal force by the front wheel phase shift angle, and the phase of the rear wheel torque command value shifts from the pedal force by the rear wheel phase shift angle. By setting the front wheel phase shift angle and the rear wheel phase shift angle to different values, the front wheel torque command value and the rear wheel torque command value are mutually shifted in phase.

Figure 4:
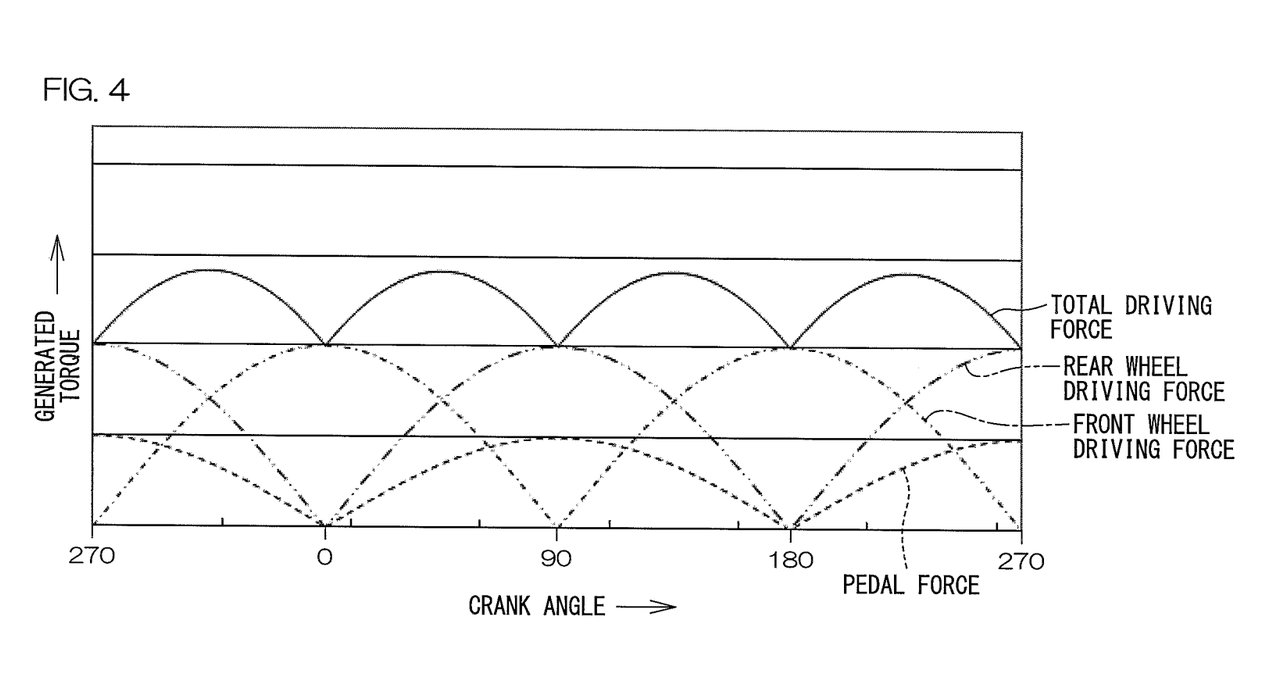
FIG. 4 is a waveform chart showing an example (working example) of the phase relationship of a pedal force, a rear wheel driving force, and a front wheel driving force.

FIG. 4 is a waveform chart showing an example of the relationship of the phases of a pedal force, a rear wheel driving force, and a front wheel driving force. The pedal force shows changes following a waveform approximating an absolute value waveform of a sine wave. The pedal force and the rear wheel torque command value are in the same phase, and therefore, the pedal force and the rear wheel driving force (=pedal force+rear wheel assist force) are in the same phase. The front wheel driving force is shifted 90 degrees in phase with respect to the pedal force, for example. Moreover, the magnitude of the front wheel driving force is, in this example, set equal to the rear wheel driving force. The rear wheel driving force and the front wheel driving force (=forward driving force) are thus mutually shifted 90 degrees in phase, and equal in peak values. Accordingly, electrical assist with less uncomfortable feeling is realized. A total driving force (rear wheel driving force+front wheel driving force) that is applied to the electrically assisted vehicle 1 displays a waveform that takes the minimum value at respective peak positions of the rear wheel driving force and the front wheel driving force and takes the maximum value between the peak positions. Fluctuations in rear wheel driving force are compensated by a phase-shifted front wheel driving force, and as a result, fluctuations in total driving force are sufficiently small and negligible as compared with fluctuations in rear wheel driving force or front wheel driving force.

Figure 5:
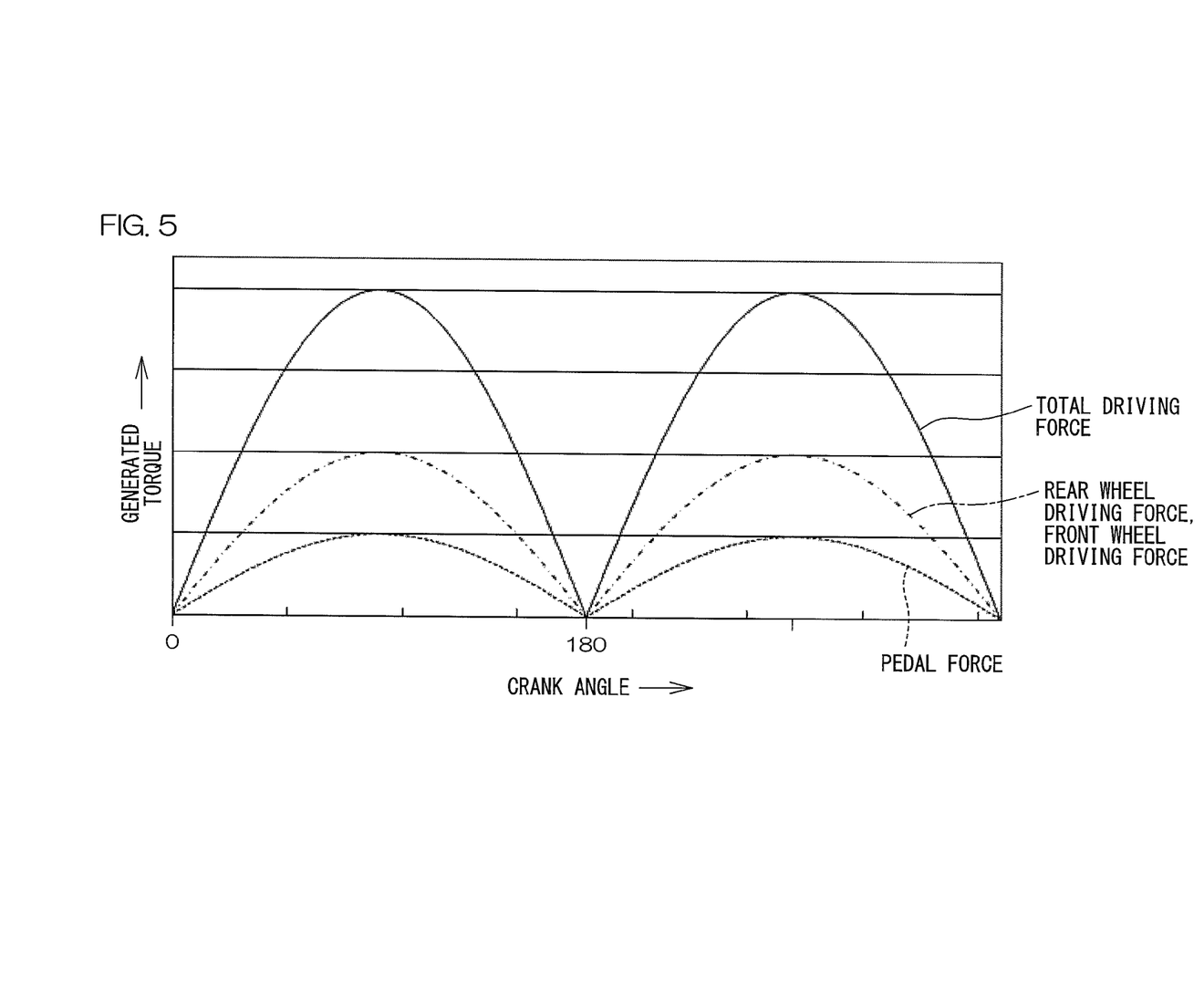
FIG. 5 is a waveform chart showing the phase relationship of a pedal force, a rear wheel driving force, and a front wheel driving force in a comparative example.

FIG. 5, which shows a comparative example, shows an example in which the phases of the rear wheel torque command value and front wheel torque command value are both made to coincide with the phase of the pedal force. In this case, the phase of a total driving force also coincides with the phase of the pedal force. The rear wheel driving force and the front wheel driving force simultaneously take peak values, and the total driving force takes the maximum value simultaneously therewith. The maximum value equals a sum of the peak values of the rear wheel driving force and front wheel driving force. The total driving force therefore greatly fluctuates. That is, the total driving force repeats a sudden increase and a sudden decrease. When the total driving force suddenly increases, the electric motors 13 and 14 suddenly accelerate. At this time, if an excess of assist occurs in a crank angle range where the driver applies a great pedal force, a feeling of no response to the pedal force may occur. This problem is solved by the arrangement of the present preferred embodiment for which the rear wheel driving force and front wheel driving force are shifted in phase.

As described above, according to the present preferred embodiment, when human power is input to the pedals 20 to rotate the crank 23, the rear wheel 4 rotates according thereto, and the electrically assisted vehicle 1 is thus caused to run. The rear wheel electric motor 14 drives the rear wheel 4 to impart a rear wheel assist force to the rear wheel 4, and the front wheel electric motor 13 drives the front wheel 3 to impart a front wheel assist force to the front wheel 3. Accordingly, human power driving is assisted by the rear wheel assist force and the front wheel assist force. The rear wheel torque command value and the front wheel torque command value for the rear wheel electric motor 14 and the front wheel electric motor 13 are mutually shifted in phase. Because an assist force to be imparted to the electrically assisted vehicle 1 is temporally smoothed, the assist force is prevented from momentarily becoming excessively great. Because a sudden decrease in resistance is accordingly avoided when a pedal force is applied to the pedals 20, the feeling of no response to the pedal force is reliably avoided, and an electrically assisted vehicle 1 with a satisfactory riding feeling is provided.

Additionally, because the rear wheel torque command value and the front wheel torque command value are mutually shifted in phase, peak values of a full drive current to be supplied to the rear wheel electric motor 14 and the front wheel electric motor 13 are made small. Because the rear wheel electric motor 14 and the front wheel electric motor 13 are accordingly driven by a battery 12 with a small output, the battery 12 is downsized, and consequently the electrically assisted vehicle 1 is significantly reduced in weight.

For avoiding the feeling of no response to the pedal force, it may be considered, in place of differentiating the rear wheel torque command value and the front wheel torque command value in phase, to make the phases thereof the same, and for example, perform control to limit the front wheel torque command value to a certain upper limit value or less. However, such control causes fluctuations in the ratio of an assist driving force to a pedal force, which thus possibly causes another uncomfortable feeling, and further possibly results in a lack of assist force. In the preferred embodiment described above for which a phase difference is provided between the rear wheel torque command value and the front wheel torque command value, there is no possibility of causing such an uncomfortable feeling and lack of assist force.

In the present preferred embodiment, because the rear wheel torque command value is in synchronization with a pedal force, an assist force that is in synchronization with a torque (pedal force) due to human power applied to the crank 23 is generated from the rear wheel electric motor 14, while an assist force shifted in phase from the assist force is generated from the front wheel electric motor 13. Because the assist force generated by the electric motors 13 and 14 accordingly includes an assist force component (rear wheel assist force) corresponding to temporal changes in pedal force, a natural riding feeling is achieved. Moreover, in the present preferred embodiment, the rear wheel assist force to be imparted to the rear wheel 4 to which a pedal force applied to the crank 23 is transmitted is in synchronization with the pedal force. Accordingly, a further natural riding feeling is achieved.

Also, in the present preferred embodiment, when the vehicle speed is sufficiently great, the rear wheel torque command value and the front wheel torque command value are shifted preferably by 90 degrees in phase when one rotation of the crank 23 is provided as one period, for example. Because the assist force accordingly is effectively smoothed, an excellent riding feeling is achieved. Additionally, because peaks of the drive current are significantly reduced or prevented, a battery 12 with a small current output is able to be used, and as a result, the electrically assisted vehicle 1 is significantly reduced in weight.

Further, in the present preferred embodiment, the rear wheel torque command value and the front wheel torque command value are matched in phase when the vehicle speed is not more than the first vehicle speed threshold, and the rear wheel torque command value and the front wheel torque command value are shifted in phase when the vehicle speed is over the first vehicle speed threshold. Accordingly, at the time of low-speed running such as the time of starting, a great assist force is imparted to the electrically assisted vehicle 1. In particular, by making assist forces to be generated by both of the rear wheel electric motor 14 and the front wheel electric motor 13 be in synchronization with a pedal force applied to the pedals 20, a great assist force that is in synchronization with the driver's pedal force is generated. Driving of the electrically assisted vehicle 1 is accordingly assisted by the great assist force at the time of low-speed running such as the time of starting. On the other hand, if the vehicle speed exceeds the first vehicle speed threshold, assist forces to be generated by the rear wheel electric motor 14 and the front wheel electric motor 13 are shifted in phase, so that the assist force is smoothed to avoid the feeling of no response to the pedal force, and a peak current is made small.

Further, in the present preferred embodiment, the rear wheel torque command value and the front wheel torque command value are shifted 90 degrees in phase when the vehicle speed is over the second vehicle speed threshold, and when the vehicle speed is over the first vehicle speed threshold and not more than the second vehicle threshold, a phase shift of the rear wheel torque command value and the front wheel torque command value is set in accordance with characteristics in which the phase shift increases from 0 degrees to 90 degrees according to an increase in vehicle speed. Therefore, the phase shift of assist forces to be generated by the rear wheel electric motor 14 and the front wheel electric motor 13 gradually increases as the electrically assisted vehicle 1 accelerates. Thus, a state transition is smoothly performed between a state with no phase shift and a state with a phase shift of 90 degrees, without negatively effecting the riding feeling, that is, without causing a feeling of discontinuity of the assist force with a sudden change in driving characteristics. Accordingly, an electrically assisted vehicle 1 with a good riding feeling is achieved.

Although a preferred embodiment of the present invention has been described above, the present invention may be carried out in yet other modes as will be exemplified below.

In the preferred embodiment described above, a vehicle preferably including the two driving wheels 3 and 4 has been described, but the number of driving wheels may not be two. That is, in the electrically assisted vehicle according to the present invention, only one driving wheel may be provided, or three or more driving wheels may be provided, for example. Also, in the electrically assisted vehicle according to the present invention, a driven wheel(s) that follows in accordance with running of the vehicle may or may not be provided. For example, in the case of a two-wheeled vehicle including a front wheel and a rear wheel, either one of the front wheel and rear wheel may be a driving wheel, and the other of those may be a driven wheel. Also, only the driving force of a human power drive system may be supplied to either one of the front wheel and rear wheel, and only the driving force of an electromotive drive system may be supplied to the other of those. As a more generalized description, a plurality of driving wheels may include a wheel (i.e., at least one wheel) to which only the driving force of a human power drive system is supplied, and a wheel (i.e., at least one wheel) to which only the driving force of an electromotive drive system is supplied. The total number of wheels may not be two, and may be one, or may be three or more, for example.

In the preferred embodiment described above, the two electric motors 13 and 14 preferably supply assist forces to the front wheel 3 and the rear wheel 4, respectively, but there may be an arrangement for which two electric motors supply assist forces to one wheel (front wheel 3 or rear wheel 4). In this case, the feeling of no response to the pedal force is reliably avoided by shifting assist forces to be generated by the two electric motors in phase.

Three or more electric motors may be provided, for example. In this case, it suffices to shift assist forces to be generated by at least two of the electric motors in phase. The three or more electric motors may impart assist forces to respective different wheels, or at least two electric motors may impart assist forces to a common single wheel. In the case of shifting assist forces to be generated by n (n is a natural number not less than 2) electric motors in phase, it is preferable to set the phase difference between torque command values of the electric motors to 180 degrees/n each, for example. In any case, the phase difference between the torque command values becomes 90 degrees or less.

In the preferred embodiment described above, the rear wheel torque command value preferably is in synchronization with a pedal force, and the phase of the front wheel torque command value is shifted from the phase of a pedal force. However, the phase of the front wheel torque command value may be synchronized with the phase of a pedal force, and the phase of the rear wheel torque command value may be shifted from the phase of a pedal force. Further, as described above, the phases of both of the front wheel torque command value and rear wheel torque command value may be shifted from the phase of a pedal force. Also in this case, it is preferable that the front wheel torque command value and the rear wheel torque command value are mutually shifted in phase.

In the preferred embodiment described above, the front wheel torque command value and the rear wheel torque command value are preferably shifted with reference to a crank angle. However, the front wheel torque command value and the rear wheel torque command value may be shifted in phase based on the phase of a pedal force, or a phase difference between the front wheel torque command value and the rear wheel torque command value may be secured by temporally shifting the phase of the front wheel torque command value and the phase of the rear wheel torque command value.

Although an electrically assisted vehicle in the mode of an electrically assisted bicycle has been exemplified in FIG. 1, an electrically assisted vehicle according to the present invention may have a mode of a moped or other vehicle, for example.

The present application corresponds to Japanese Patent Application No. 2013-238176 filed in the Japan Patent Office on Nov. 18, 2013, and the entire disclosure of the application is incorporated herein by reference.

While preferred embodiments of the present invention have been described above, it is to be understood that variations and modifications will be apparent to those skilled in the art without departing the scope and spirit of the present inven-

What is claimed is:

1. An electrically assisted vehicle comprising:
a vehicle body;
pedals to input human power;
a crank that is coupled to the pedals and freely rotatably supported on the vehicle body;
a wheel that is attached to the vehicle body and is configured to rotate according to a rotation of the crank;
a first electric motor that is attached to the vehicle body and is configured to drive the wheel;
a second electric motor that is attached to the vehicle body and is configured to drive the wheel or another wheel;
a torque detection unit that is configured to detect a torque applied to the crank;
a torque command value calculation unit that is configured or programmed to calculate a first torque command value for the first electric motor and a second torque command value for the second electric motor according to the torque detected by the torque detection unit and calculate the first and second torque command values such that the first and second torque command values are mutually shifted in phase; and
a motor drive unit that is configured to drive the first electric motor and second electric motor according to, respectively, the first torque command value and the second torque command value calculated by the torque command value calculation unit.

2. The electrically assisted vehicle according to claim 1, wherein one of the first torque command value and the second torque command value is in synchronization with the torque detected by the torque detection unit.

3. The electrically assisted vehicle according to claim 1, wherein
the wheel is a rear wheel, and the another wheel is a front wheel;
a rotating force of the crank is transmitted to the rear wheel;
the first electric motor is configured to drive the rear wheel;
the second electric motor is configured to drive the front wheel; and
the first torque command value or the second torque command value is in synchronization with the torque detected by the torque detection unit.

4. The electrically assisted vehicle according to claim 1, wherein
the wheel includes a first wheel to which a rotating force of the crank is transmitted;
the another wheel is a second wheel to which a rotating force of the crank is not transmitted;
the first electric motor is configured to drive the first wheel; and
the first torque command value is in synchronization with the torque detected by the torque detection unit.

5. The electrically assisted vehicle according to claim 1, wherein the first torque command value and the second torque command value are shifted 90 degrees in phase when one rotation of the crank equals one period.

6. The electrically assisted vehicle according to claim 1, further comprising a vehicle speed detection unit that is configured to detect a vehicle speed of the electrically assisted vehicle, wherein
the torque command value calculation unit is configured to match the first torque command value and the second torque command value in phase when the vehicle speed detected by the vehicle speed detection unit is not more than a first speed, and shift the first torque command value and the second torque command value in phase when the vehicle speed detected by the vehicle speed detection unit is greater than the first speed.

7. The electrically assisted vehicle according to claim 6, wherein the torque command value calculation unit is configured to shift the first torque command value and the second torque command value 90 degrees in phase when the vehicle speed detected by the vehicle speed detection unit is greater than a second speed that is greater than the first speed, and calculate the first and second torque command values in accordance with characteristics in which a phase shift of the first torque command value and second torque command value increases from 0 degrees to 90 degrees according to an increase in the vehicle speed when the vehicle speed detected by the vehicle speed detection unit is greater than the first speed and not more than the second speed.

* * * * *